United States Patent
Shim et al.

(10) Patent No.: US 7,785,496 B1
(45) Date of Patent: Aug. 31, 2010

(54) ELECTROCHROMIC INKS INCLUDING CONDUCTING POLYMER COLLOIDAL NANOCOMPOSITES, DEVICES INCLUDING THE ELECTROCHROMIC INKS AND METHODS OF FORMING SAME

(75) Inventors: Goo Hwan Shim, Pendleton, SC (US); Moon Gyu Han, Dunlap, IL (US); Stephen H. Foulger, Clemson, SC (US)

(73) Assignee: Clemson University Research Foundation, Anderson, SC (US)

( * ) Notice: Subject to any disclaimer, the term of this patent is extended or adjusted under 35 U.S.C. 154(b) by 113 days.

(21) Appl. No.: 12/019,084

(22) Filed: Jan. 24, 2008

Related U.S. Application Data

(60) Provisional application No. 60/897,722, filed on Jan. 26, 2007.

(51) Int. Cl.
*H01B 1/00* (2006.01)
*B05D 5/12* (2006.01)

(52) U.S. Cl. ............ 252/500; 252/511; 252/520.1; 252/521.3; 106/31.58; 427/214; 428/32.1; 359/265

(58) Field of Classification Search .......... 252/500, 252/521.3, 511, 520.1; 106/31.13, 31.57, 106/31.58, 31.92; 315/5.38; 347/95; 427/214; 428/32.1; 359/265
See application file for complete search history.

(56) References Cited

U.S. PATENT DOCUMENTS

| | | | |
|---|---|---|---|
| 4,221,830 A | | 9/1980 | Dalens et al. |
| 4,375,044 A | * | 2/1983 | Ek ........................ 315/5.38 |
| 5,003,178 A | | 3/1991 | Livesay |
| 5,037,917 A | | 8/1991 | Babb et al. |
| 5,159,038 A | | 10/1992 | Babb et al. |
| 5,169,436 A | * | 12/1992 | Matrick ................... 106/31.58 |

(Continued)

FOREIGN PATENT DOCUMENTS

EP A1081548 7/2001

(Continued)

OTHER PUBLICATIONS

Gill et. al., "Novel Colloidal Polyaniline-Silica Composites", J.Chem. Soc., Chem. Commun., Sep. 9, 1991, pp. 108-109.*

(Continued)

*Primary Examiner*—Mark Kopec
*Assistant Examiner*—Khanh Tuan Nguyen
(74) *Attorney, Agent, or Firm*—Dority & Manning, P.A.

(57) ABSTRACT

Disclosed are electrochromic inks and devices incorporating the inks as well as methods for forming the inks and the devices. The disclosed inks include a dispersion of colloidal nanocomposite particles in a liquid carrier. The colloidal nanocomposites of the disclosed inks include nanoparticle templates, e.g., silica nanoparticles, and an intrinsically conductive polymer polymerized at the template nanoparticles. The inks can include a dispersion of the colloidal nanocomposites in a liquid carrier such as an aprotic polar organic solvent. The disclosed inks can be formulated to be utilized in any desired printing process such as inkjet printing processes. Products encompassed by the invention include all-polymer electronic, optic, photonic, electro-optic, and energy devices such as sensors, OFETs, RFID tags, printed circuit board, electrochromic devices, non-volatile memory devices, photovoltaics, and the like.

28 Claims, 11 Drawing Sheets

U.S. PATENT DOCUMENTS

| | | | |
|---|---|---|---|
| 5,189,952 A | 3/1993 | Ohmura et al. | |
| 5,286,415 A | 2/1994 | Buckley et al. | |
| 5,389,403 A | 2/1995 | Buckley et al. | |
| 5,413,739 A * | 5/1995 | Coleman | 252/511 |
| 5,415,893 A | 5/1995 | Wiersma et al. | |
| 5,656,081 A | 8/1997 | Isen et al. | |
| 5,739,832 A | 4/1998 | Heinzl et al. | |
| 5,812,300 A * | 9/1998 | Coleman | 359/265 |
| 5,962,995 A | 10/1999 | Avnery | |
| 6,165,388 A * | 12/2000 | Coleman | 252/520.1 |
| 6,358,437 B1 | 3/2002 | Jonas et al. | |
| 6,394,585 B1 | 5/2002 | Ross | |
| 6,399,675 B1 | 6/2002 | Kim et al. | |
| 6,407,492 B1 | 6/2002 | Avnery et al. | |
| 6,486,227 B2 | 11/2002 | Nohr et al. | |
| 6,497,510 B1 | 12/2002 | Delametter et al. | |
| 6,501,587 B1 | 12/2002 | Ferraris et al. | |
| 6,527,378 B2 | 3/2003 | Rausch et al. | |
| 6,536,873 B1 | 3/2003 | Lee et al. | |
| 6,536,895 B2 | 3/2003 | Kashiwagi et al. | |
| 6,543,872 B2 | 4/2003 | Ohtsuka et al. | |
| 6,550,904 B2 | 4/2003 | Koitabashi et al. | |
| 6,561,642 B2 | 5/2003 | Gonzalez | |
| 6,598,966 B2 | 7/2003 | Ferraris et al. | |
| 6,646,106 B1 | 11/2003 | Lemaire et al. | |
| 6,652,777 B2 | 11/2003 | Rapp et al. | |
| 6,780,896 B2 | 8/2004 | MacDonald et al. | |
| 6,890,584 B2 | 5/2005 | Leenders et al. | |
| 7,008,556 B2 | 3/2006 | Casasanta, III et al. | |
| 2001/0002275 A1* | 5/2001 | Oldenburg et al. | 427/214 |
| 2002/0149656 A1* | 10/2002 | Nohr et al. | 347/95 |
| 2005/0070654 A1 | 3/2005 | Hsu | |
| 2006/0093760 A1* | 5/2006 | Taka et al. | 428/32.1 |

FOREIGN PATENT DOCUMENTS

| | | |
|---|---|---|
| EP | A1081549 | 7/2001 |
| JP | 00189796 | 8/2004 |
| WO | WO 2007111996 | 10/2007 |

OTHER PUBLICATIONS

Moon Gyu Han and Steven P. Armes, "Synthesis of Poly(3,4-ethylenedioxythiophene)/Silica Colloidal Nanocomposites," *Langmuir The ACS Journal of Surfaces and Colloids*, May 27, 2003, vol. 19, No. 11, p. 4523.

Moon Gyu Han and Stephen H. Foulger, "Preparation of poly(3,4-ethylenedioxythiophene)(PEDOT) coated silica core-shell particles and PEDOT hollow particles," *J. Chem. Soc., Chem. Commun.*, 2004, p. 2154.

Gill, et al., "Novel colloidal polyaniline-silica composites," *J. Chem. Soc., Chem. Commun.*, 1992, p. 108.

Shim, et al., "Inkjet Printed Electrochromic Polyaniline Layer for the Fabrication of Electrochromic Devices," *Polymeric Materials: Science & Engineering*, 2006, vol. 94, p. 877.

Kody Varahramyan and Yuri Lvov, "Nanomanufacturing by Layer-by-Layer Assembly," $3^{rd}$ International Symposium on Nanomanufacturing, Cyprus, Nov. 2005.

Moon Gyu Han and Stephen H. Foulger, "Crystalline Colloidal Arrays Composed of Poly(3,4-ethylenedioxythiophene)- Coated Polystyrene Particles with a Stop Band in the Visible Regime," *Adv. Matter*, 2004, vol. 16, No. 3, p. 231.

M. J. Burchell, et al., "Acceleration of conducting polymer-coated latex particles as projectiles in hypervelocity impact experiments," *J. Phys. D: Appl. Phys.*, vol. 32, p. 1719.

* cited by examiner

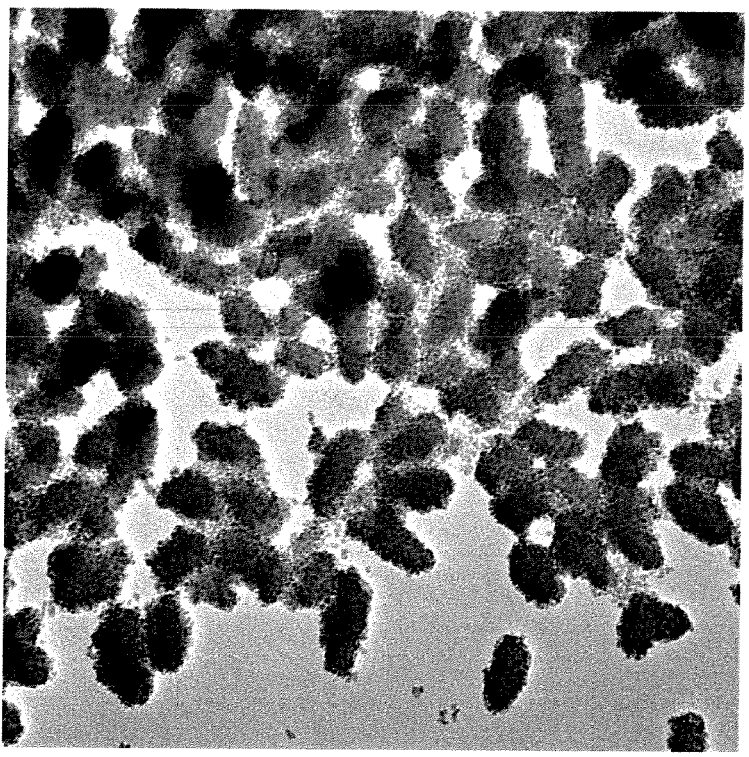
Figure 3A
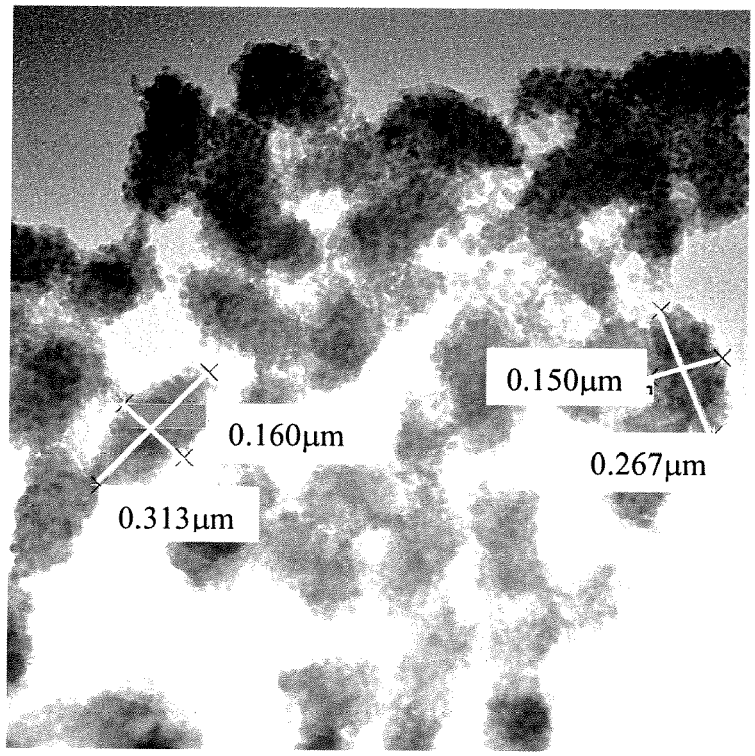
Figure 3B
Figure 3

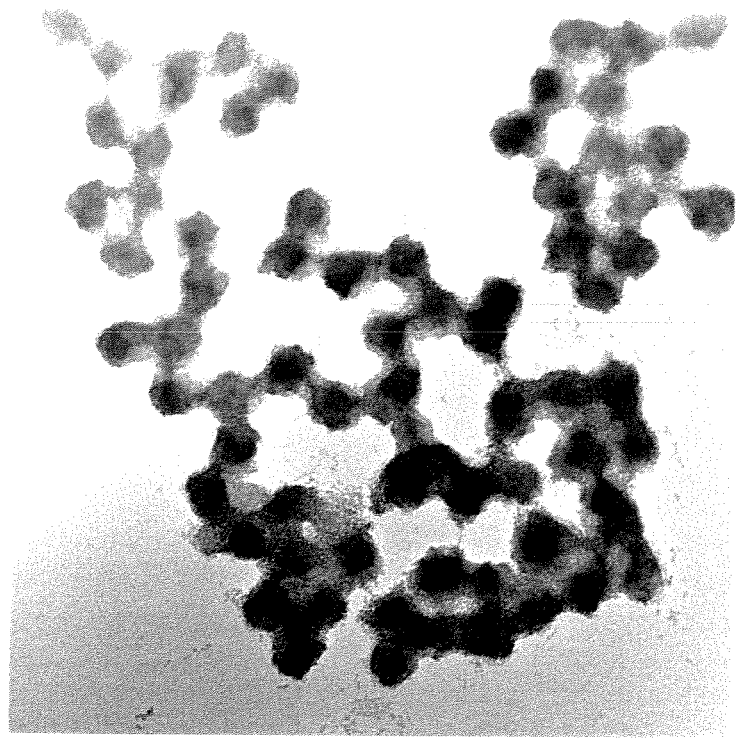
Figure 4A
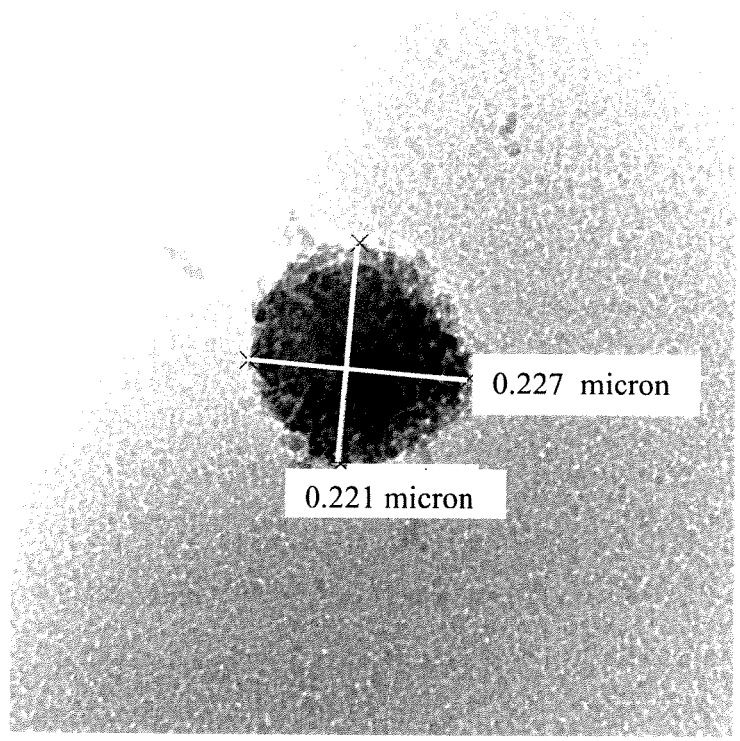
Figure 4B
Figure 4

Figure 5
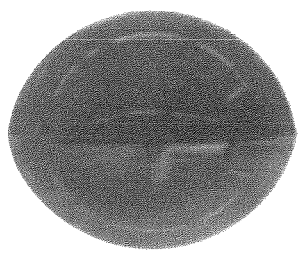 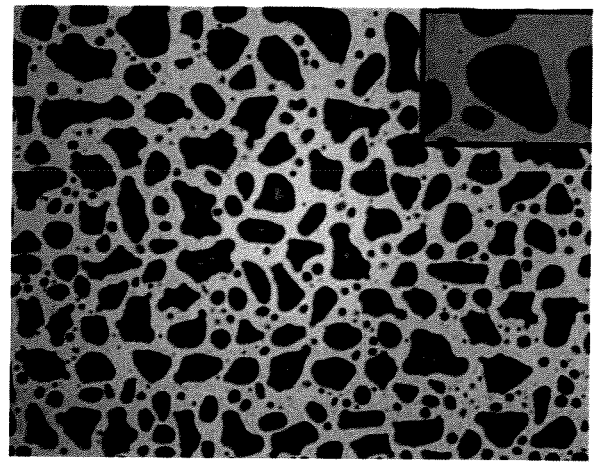
Figure 5A　　　　　　　　　　　　　　Figure 5B
Figure 6
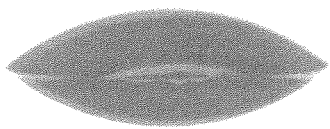 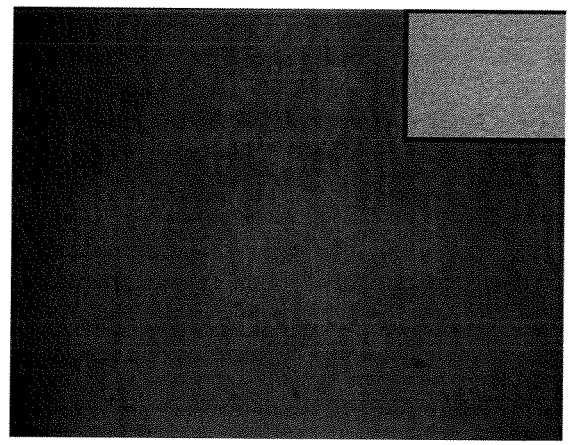
Figure 6A　　　　　　　　　　　　　　Figure 6B

8A

8B a.

b.

c.

ELECTROCHROMIC INKS INCLUDING CONDUCTING POLYMER COLLOIDAL NANOCOMPOSITES, DEVICES INCLUDING THE ELECTROCHROMIC INKS AND METHODS OF FORMING SAME

CROSS REFERENCE TO RELATED APPLICATION

The present application claims priority to U.S. Provisional Patent Application Ser. No. 60/897,722 filed on Jan. 26, 2007, which is incorporated herein by reference in its entirety.

FEDERALLY SPONSORED RESEARCH AND DEVELOPMENT

The United States Government may have rights to information disclosed herein pursuant to a grant from the United States Army having a grant no. N00014-06-D0045.

BACKGROUND

Conductive inks have been used for many years in a variety of applications. For instance, conductive inks have been printed on various substrate materials to form conductive circuits as are found in radio frequency identification tags, touch pads, and flexible circuits. Traditionally, conductive inks used for such applications included a dispersion of conductive particles, either metal (e.g., silver) or carbon, in a resin system designed to meet the specifications of both the formation process and the end-use application. Conductive inks have greatly reduced both the monetary and environmental costs associated with various types of products such as circuits, as the traditional etching process for forming electronic circuits required many separate steps and generated significant hazardous waste problems. U.S. Pat. No. 5,189,952 to Ohmura, et al., U.S. Pat. No. 4,221,830 to Dalens, et al., U.S. Pat. No. 5,286,415 to Buckley, et al., U.S. Pat. No. 5,389,403 to Buckley, et al., and U.S. Pat. No. 5,656,081 to Isen, et al. exemplify several metal and/or carbon particle-containing conductive inks.

Recently, intrinsically conductive polymers (ICP) have been examined as possible replacement materials for the conductive particles found in more traditional conductive inks. For instance, ICP inks have been suggested for use in forming printable anti-static coatings, smart windows, corrosion control layers, EMI/RFI shielding, and in photovoltaic applications. U.S. Pat. No. 6,358,437 to Jonas, et al., U.S. Patent Application Publication 2005/0070654 to Hsu, and European Patent Application Publications EP-A 1 081 549 and EP-A 1 081 548, exemplify some recent trends toward forming printable or otherwise castable compositions through inclusion of conductive polymers in the formulations. For instance, Hsu discloses a composition including an aqueous dispersion of electrically conducting organic polymers and a plurality of nanoparticles. The films cast from the composition are useful as buffer layers and have a much lower conductivity than a similar buffer layer without the nanoparticles.

One of the more recent advances in the utilization of ICPs has been in the development of electrochromic devices (ECD) that include electroactive materials capable of generating a visible, chromatic effect upon change in electrical state of the materials. For instance, U.S. Pat. No. 5,500,759 to Coleman describes an ECD including an essentially ionically isolative composite layer including a dispersion of electrically conductive polymers in a polymer matrix. U.S. Pat. No. 6,501,587 to Ferraris, et al. relates to an apparatus, a process, and a resulting device that can be used to create an image using an electrochromic polymer ink. The electrochromic polymer ink of Ferraris, et al. includes a colloidal electrochromic polymer pigment dissolved in an aqueous solvent solution.

Problems and room for improvement still exist in the art. For instance, conductive polymer inks that could be used in high-speed, non-contact printing processes such as inkjet printing would be beneficial as such printing processes can generate high resolution patterns at high speed using a small volume of materials. It has proven difficult, however, to provide electrochromic inks capable of forming on a substrate a pattern of uniform coating that can exhibit high resolution, good conductivity and robust adhesion.

What are needed in the art are conductive polymer inks that can be formulated with characteristics suitable for desired printing processes, and in one particular embodiment, for inkjet printing processes.

SUMMARY

Disclosed in one embodiment is a printable ink. In one embodiment, a printable ink can include a carrier liquid and composite nanoparticles dispersed within the carrier liquid. More specifically, the composite nanoparticles can include a core and an intrinsically conductive polymer at the surface of the core. Thus, the composite nanoparticles can exhibit conductivity, for example a conductivity between about $1\times10^{-4}$ S/cm and about 10 S/cm. The composite particles can exhibit a color change upon a change in the electrical state of the nanoparticles, hence, disclosed inks can be electrochromic in nature.

Also disclosed are devices comprising the inks. Disclosed devices can include the inks deposited in a pattern on a surface of a substrate. For example, the substrate can be conductive or non-conductive. In one embodiment, disclosed devices can include electrochromic devices in which disclosed ink has been printed on a conductive substrate. In another embodiment, disclosed devices can include solvatochromic chemical sensors including, for example, disclosed inks printed on a non-conductive substrate such as a fabric.

Also disclosed are methods for forming a printed device comprising printing a pattern on a substrate with disclosed inks. Printing methods can include non-contact printing methods and, in one particular embodiment, inkjet printing of disclosed inks.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which:

FIGS. 3A and 3B are transmission electron microscopy (TEM) images of polyaniline (PANI)-silica nanocomposite particles as described herein;

FIGS. 4A and 4B are TEM images of poly(3,4-ethylenedioxythiophene) (PEDOT)-silica nanocomposite particles as described herein;

FIG. 5 illustrates a droplet of a PANI-silica nanocomposite aqueous dispersion on an ITO-PET film (FIG. 5A) and the microscopic surface appearance of the aqueous dispersion following inkjet printing on an ITO-PET film (FIG. 5B);

FIG. 6 illustrates a droplet of an inkjet ink including PANI-silica nanocomposite particles as described herein on an ITO-PET film (FIG. 6A) and the microscopic surface appearance of the ink following inkjet printing on an ITO-PET film (FIG. 6B);

DETAILED DESCRIPTION

Figure 1:
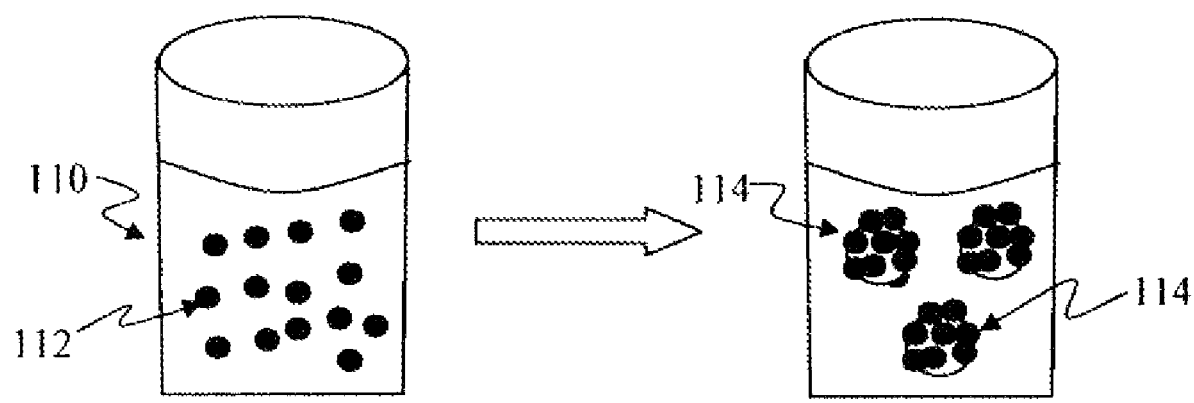
FIG. 1 is a schematic representation of an exemplary formation process for electrochromic colloidal nanocomposite particles as herein disclosed.

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to embodiments described in the present disclosure without departing from the scope or spirit of the disclosure. For instance, features illustrated or described as part of one embodiment, may be used in another embodiment to yield a still further embodiment.

In one embodiment, the present disclosure is directed to electrochromic inks. The present disclosure is also directed to devices that can incorporate the disclosed inks, as well as methods of forming such devices. The disclosed inks can be formulated so as to be suitable for use in any desired printing process, and in one particular embodiment, in a direct non-contact patterning method such as inkjet printing. The disclosed inks can be beneficially utilized in forming a wide variety of products including all-polymer electronic, optic, photonic, electro-optic, and energy devices such as sensors, OFETs, RFID tags, printed circuit board, electrochromic devices, non-volatile memory devices, photovoltaics, and the like. For instance, the disclosed inks can be printed on a non-conductive or a conductive substrate and used in sensors, light emitting diodes (LEDs), patterned electrodes, transistors, and the like. In one preferred embodiment, disclosed electrochromic inks can be printed on a conductive substrate and used in forming an electrochromic device (ECD). Generally speaking, an electrochromic device can include one or more electrochemical cells that can change color upon application of an electric potential across the cell. There has been significant interest in the fabrication of ECDs due to potential applications such as display devices, information storage devices, smart materials including mirrors, visors, windows, camouflage materials, and the like.

Electrochromic inks as described herein include a dispersion of colloidal nanocomposite particles in a carrier fluid. More specifically, the colloidal nanocomposite particles can include an intrinsically conductive polymer (ICP) that has been polymerized in the presence of nano-sized template particles, for instance, an ICP may be polymerized on one or more nano-sized template particles to form a single composite nanoparticle.

A template nanoparticle can be any inorganic nano-sized particle that can serve as a polymerization stabilizer and/or site of polymerization during the polymerization process of the ICP. Without wishing to be bound by any particular theory, it is believed that when polymerized in the presence of template nanoparticles as described herein, an ICP can polymerize and form composite nanoparticles including the polymerized ICP material adhered to one or more template nanoparticles. The formed composite nanoparticles can exhibit excellent colloidal stability, as described further below. Inorganic materials for use as a template nanoparticle can include any nano-sized particle having high colloidal stability. By way of example, template nanoparticles can include, without limitation, titanium dioxide ($TiO_2$), zinc oxide (ZnO), tin(IV) oxide ($SnO_2$), antimony doped tin(IV) oxide ($ASnO_2$), and the like, as well as mixtures of nanoparticles. In one preferred embodiment, template nanoparticles can be silica ($SiO_2$)-based particles. In addition, template nanoparticles can be formed or provided in any suitable dispersion medium. For instance, aqueous silica sol particles or methanolic silica sol particles can be utilized. A variety of commercial sources of suitable nanoparticles are also known, include, without limitation, Nyacol Nano Technologies, Inc. of Ashland, Mass.; Nissan Chemical, of Houston, Tex.; NN-Labs, LLC, of Fayetteville, Ark.; and so forth.

In general, template nanoparticles can be less than about 50 nanometers (nm) in size, for instance less than about 30 nm. In one embodiment, the template nanoparticles can be between about 20 nm and about 30 nm in size.

The composite nanoparticles of disclosed inks include an ICP that has been polymerized in the presence of template nanoparticles. Monomers that can be polymerized to form ICP of the nanocomposites can include any monomer that, upon polymerization, can exhibit intrinsic conductivity. For instance, a variety of polymers, including copolymers and/or derivatives of polyaniline (PANI), polypyrrole, polythiophene, poly(ethylenedioxythiophene) (PEDOT), and poly(p-phenylene vinylene) are known in the art and can be polymerized in the presence of nanoparticles to form composite nanoparticles.

A schematic representation of one method of forming composite nanoparticles is illustrated in FIG. 1. As can be seen with reference to the Figure, an aqueous suspension or dispersion 110 of nanoparticles 112 can be formed or provided. To this suspension or dispersion can be added one (or more) monomers that can be polymerized to form an ICP along with desired reactants (e.g., a monomeric dopant and an oxidant). Upon establishment of suitable reaction conditions, the ICP monomer(s) can polymerize in the presence of the nanoparticles 112 to form composite nanoparticles 114. For instance, a formation reaction can be carried out according to an oxidative polymerization process. Oxidative polymerization formation of ICPs is known to those in the art and has been described elsewhere (see, e.g., Mill, et al., *J. Chem. Soc., Chem. Commun.*, p. 108, 1992, and Han, et al., *Langmuir*, 19:4523, 2003, both of which are incorporated herein in their entirety).

An oxidative polymerization process used to polymerize ICP in the presence of nanoparticles and form composite nanoparticles can include addition of a dopant in the reactants. In one embodiment, a nanocomposite particle formation process can include addition of a monomeric dopant in the ICP oxidative polymerization step. By way of example, p-toluenesulfonic acid (p-TSA) can be utilized as a dopant. Other suitable monomeric dopants can include, without limitation, ferric chloride ($FeCl_3$), hydrochloric acid (HCl), sulfuric acid ($H_2SO_4$), camphorsulfonic acid (CSA), methanesulfonic acid (MSA), dodecylbenzenesulfonic acid (DBSA), ferric toluenesulonate (FeOTS), and the like. While not wishing to be bound by any particular theory, it is believed that utilization of a monomeric dopant in the polymerization scheme can encourage development of nanocomposite particles.

As is known in the art, the characteristics of formed ICPs can vary depending upon the nature or presence of a dopant in the polymer. Accordingly, presence and type of dopant can be utilized to effect the characteristics of the formed composite nanoparticles as well as an ink incorporating the composite nanoparticles and a product formed with the ink. For instance, a monomeric dopant can be selected that can provide improved compatibility between a formed ink incorporating the nanocomposite particles (i.e., the composite nanoparticles, these two terms are used interchangeably throughout this disclosure) and a substrate to which the ink is applied.

An oxidative polymerization process utilizes an oxidizing agent to initiate polymerization. Upon addition of a suitable oxidant to the aqueous mixture and establishment of any necessary reaction conditions, an ICP monomer can polymerize at the template nanoparticles. Polymerization initiators/oxidants for ICP monomers are well known in the art, any of which may be utilized in formation of disclosed nanocomposite particles. As is known in the art, preferred polymerization initiators of any particular system can depend at least in part upon the oxidation potential of the initiator, the polymerization potential of the monomers, and presence and type of monomeric dopant, among other factors.

When included, a monomeric dopant and the oxidant can be provided to the reaction scheme as two different materials. For instance, aniline can be polymerized from solution upon the addition of an oxidative polymerization initiator such as ammonium peroxydisulfate (APS) while in the presence of a monomeric dopant such as p-TSA. This is not a requirement, however, and in other embodiments, the oxidant can also serve as a monomeric dopant. For instance, polypyrrole can be formed in the presence of $FeCl_3$, which can function as both the oxidative polymerization initiator as well as the monomeric dopant.

Referring again to FIG. 1, polymerization of an ICP at the template nanoparticles 112 can lead to the formation of colloidal composite nanoparticles 114. In the illustrated embodiment, the colloidal nanoparticles 114 can be generally spherical in shape and can have a rough surface morphology. Nanocomposite particles as disclosed herein are in no means limited to this particular morphology, however.

Colloidal nanocomposite particles can generally be less than about 1 micrometer in maximum cross section. In one embodiment, nanocomposite particles can be less than about 500 nanometers in maximum cross section, or smaller in other embodiments, for instance less than about 400 nm, or less than about 300 nm. In one particular embodiment, nanocomposite particles can be between about 200 nm and about 300 nm in maximum cross section.

Nanocomposite particles can describe excellent colloidal stability. For example, nanocomposite particles as disclosed herein can have a zeta potential of greater than about ±40 mV at pH7. In one embodiment, nanocomposite particles can have a zeta potential of greater than about ±50 mV at pH7, or greater than about ±60 mV at pH7, in another embodiment. Good colloidal stability of the nanocomposite particles can provide for better control of solid content of an ink that includes the particles. In addition, good colloidal stability of the nanocomposite particles can allow for a wide selection of dispersion mediums that can be utilized with the particles. For instance when considering the re-dispersion of nanocomposite particles into a medium different from the initial aqueous medium in which the particles have been formed, the re-dispersion can be more successful with highly stable colloids.

Disclosed nanocomposite particles can also exhibit excellent electrical characteristics. For instance, nanocomposite particles can exhibit a conductivity between about $1 \times 10^{-4}$ S/cm and about 10 S/cm, for instance about 1 S/cm in one embodiment.

Electrochromic inks can be formed that include a dispersion of disclosed nanocomposite particles in a carrier liquid. Beneficially, the carrier liquid of an ink can be any of a wide variety of liquid vehicles, and need not be limited to those that can act as a medium during formation of the nanocomposite particles, as is the case for many previously known conductive polymer inks. For example, following formation of the nanocomposite particles in an aqueous medium, the nanocomposite particles can be separated from other constituents utilized in the formation process and re-dispersed in a different carrier liquid. This is not a requirement, however, and in other embodiments, the formed aqueous dispersion can be utilized as is as the base for an aqueous-based ink.

In one embodiment, the formed nanocomposite particles can be purified, via, e.g., centrifugation or freeze-drying, prior to re-dispersion in a liquid carrier. In an exemplary freeze-drying process, the solvent is crystallized, resulting in separation of the solutes (the nanocomposite particles) from the solvent. The crystalline solvent can then be removed by, e.g., sublimation under vacuum.

Following separation of nanocomposite particles from the medium of formation, the particles can be re-dispersed in a liquid carrier desired for use in a particular printing process and/or with a particular substrate or class of substrates. For example, an ink can be formulated for utilization in an inkjet printing process as may be used to form a high a resolution pattern on a high surface energy substrate, e.g., a polymeric substrate or a high surface energy conductive substrate. Accordingly, the ink formulation of this embodiment can preferably have a low surface tension, to improve coating of the substrate, and the carrier liquid can be selected accordingly.

A liquid carrier can also be selected based upon the polarity and/or the proticity (protic or aprotic) of the liquid. For instance, an aprotic liquid carrier can provide an ink with improved coating and cohesion on a particular substrate.

In one preferred embodiment, the carrier liquid can be an organic medium. For example, following formation in an aqueous medium, the nanocomposite particles can be re-dispersed in an aprotic polar organic solvent. Organic solvents can exhibit low surface tension (for example, less than about 50 dyn/cm, or less than about 25 dyn/cm) and as such an ink formulation including an organic carrier can effectively wet and spread on high surface energy substrates during printing, for instance on metal coated polyester substrates.

Electrochromic inks as described herein can include one or more of a variety of liquid carriers. For example, a combination of liquid carriers can be utilized, e.g., to adjust final viscosity of the ink.

Previously known electrochromic inks contain ICPs with highly conjugated chains dissolved in a carrier. The carriers of these inks are often toxic and vigorous organic solvents such as N-methyl-2-pyrrolidinone (NMP), xylene, m-cresol, and the like. Such inks have proven quite difficult to process, in particular with regard to blending of different electrochromic materials. Disclosed colloidal electrochromic nanocomposite particles, in contrast, exhibit excellent processability characteristics. While not wishing to be bound by any particular theory, this is believed to be due at least in part to the colloidal nature of the nanocomposite particles. As such, disclosed inks can be prepared according to a relatively facile process to include a blend of different nanocomposite particles in a single carrier liquid. For instance, different particle compositions can be prepared, each of which has the same carrier medium. To form a blend, different compositions containing different particles can simply be mixed together in the desired proportions. Through the blending of different types of nanocomposite particles as well as through control of the relative amounts of the different electrochromic materials combined in a single ink, the disclosed inks can be easily tuned to exhibit a desired electrochromic effect.

Figure 8:
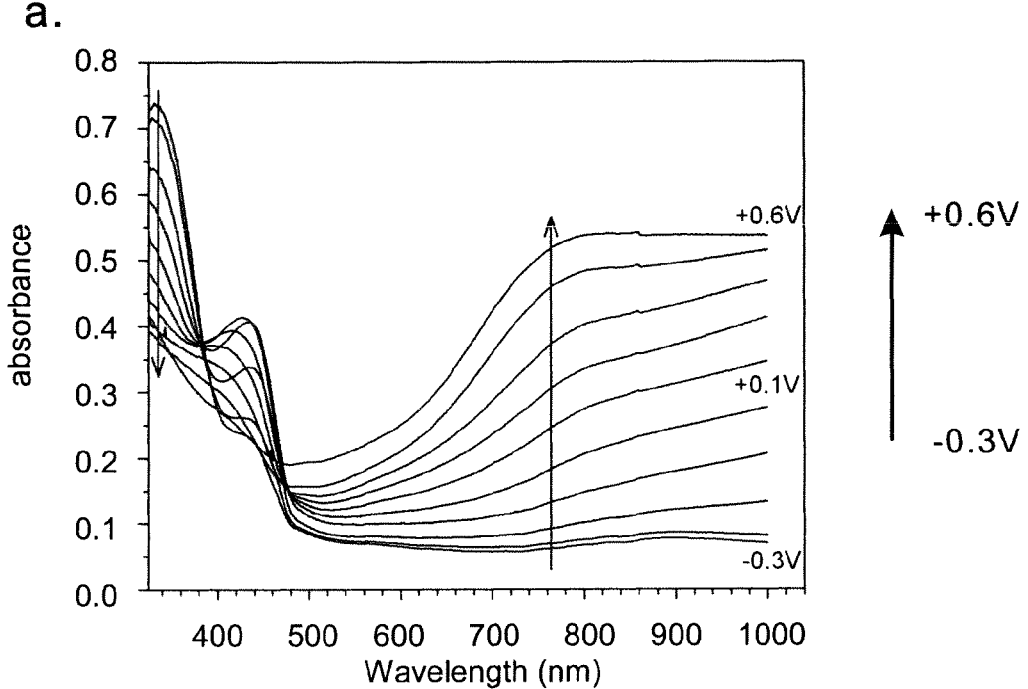
FIG. 8A illustrates the spectroelectrochemical characterization of an ECD formed with a PANI-based ink as described herein.
FIG. 8B illustrates the spectroelectrochemical characterization of an ECD formed with a PEDOT-based ink as described herein.
Figure 8:
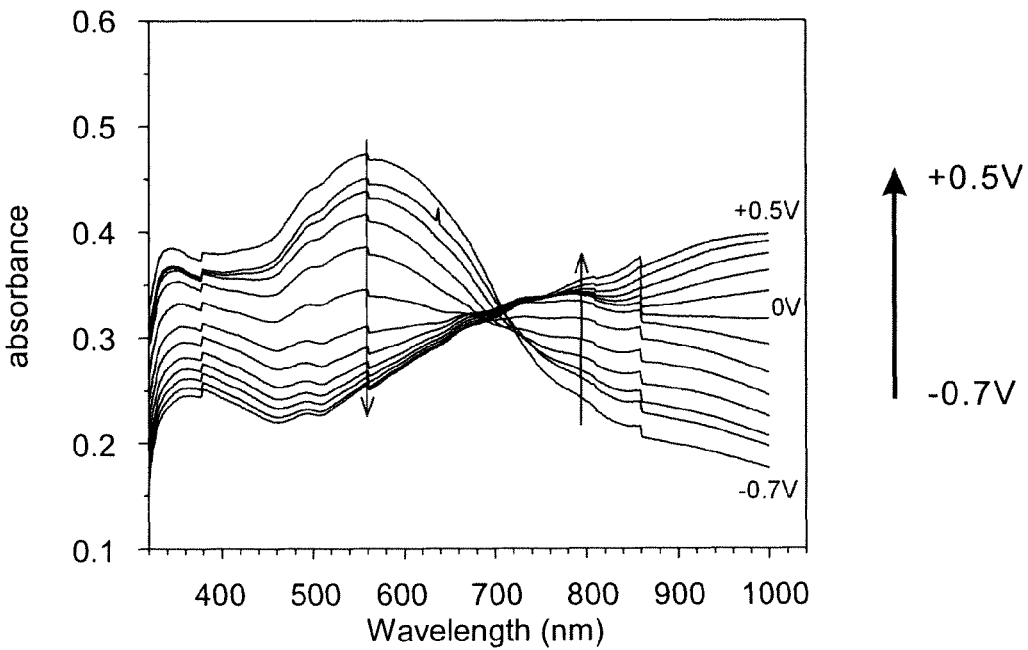

The capability of tuning the color of products that incorporate electrochromic inks remains of primary importance in product design. The electrochromic properties of presently disclosed inks can generally depend upon the ICP included in the nanocomposite particles. For instance, the UV-Vis absorption spectra of an electrochromic ink including PANI nanocomposites (FIG. 8A) is quite different than the UV-Vis absorption spectra of an electrochromic ink including PEDOT nanocomposites (FIG. 8B). As disclosed nanocomposite particles exhibit excellent processability characteristics, however, the electrochromic characteristics of products incorporating the disclosed inks can be easily controlled through, e.g., selection of an ICP utilized in forming an ink and/or the blending of different particles in forming an ink.

Preferred concentration of nanocomposite particles in a formed ink can depend at least in part upon the printing method for which the ink is intended. For instance, when considering inkjet inks, a formed ink can generally have a solids content of less than about 15% by weight, so as to maintain a suitably low viscosity for inkjet printing. The viscosity of an inkjet ink can generally be between about 10 mPaS and about 20 mPaS. The solids content of other types of inks, however, can vary so as to provide the desired viscosity for that particular type of ink. For instance, the viscosity in inks can be between about 8 mPaS and about 12 mPaS, or greater than about 20 mPaS, in other embodiments. Such determinations as to solids content and corresponding viscosity for any particular ink type and/or printing process are well within the capabilities of one of ordinary skill in the art.

Generally, any ink additive as is known in the art can be included in disclosed inks. Preferred additives can depend upon the printing method for which the ink is intended as well as upon the substrates onto which the inks will be printed. For instance, an inkjet ink can include, in addition to nanocomposite particles and a suitable liquid carrier, inkjet ink additives such as, without limitation, humectants, penetrating agents, and drying agents.

Humectants can regulate drying speed of the ink, so as to prevent drying of the ink prior to printing as well as to prevent clogging of the print head nozzles. Exemplary humectants can include, for example, polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone, and the like. In one embodiment, an inkjet ink can include less than about 10% humectant by weight, for instance less than about 5% by weight, in one embodiment.

Penetrating agents as may be incorporated in the disclosed inks can include traditional penetrating agents such as glycol ethers, e.g., diethylene glycol monobutyl ether and triethylene glycol monobutyl ether. Other suitable penetrants can include, without limitation, ethanol, isopropanol, and 2-pyrrolidone. An inkjet ink can generally include less than about 10% by weight of a penetrating agent. For instance less than about 5% by weight, in one embodiment.

An ink can also include a drying agent so as to increase drying speed following the printing process. One exemplary drying agent as may be included is diethyl ether. In general, disclosed inks can include a drying agent in an amount of less than about 5% by weight, for instance less than about 3% by weight in another embodiment.

In one embodiment, an ink can include one or more surfactants. For instance, an ink can include less than about 2% by weight of a surfactant. An exemplary listing, without limitation, of surfactants that can be incorporated in an ink can include non-ionic, amphoteric or anionic surfactants such as SURFYNOL™ surfactants, available from Air Products Corporation; SYNPERONIC™ surfactants, available from UNIQEMA; ZONYL™ surfactants, available from the DuPont Corporation; FLUORAD™ surfactants, available from the 3M Corporation; PLURONIC™ surfactants, available from BASF; Tegoglide™ and Tegowet™ surfactants, available from Goldschmidt; LOMAR™ surfactants, available from the Hinkel Corporation; AEROSOL™ surfactants, available from American Cyanamid; DOWFAX™ surfactants, available from Dow Corning; and NIAPROOF ANIONIC™ surfactants, available from Niacet.

Other possible ink additives can include one or more plasticizers, which can increase the flexibility of the ink and assist in maintaining adhesion of the ink to the substrate. Other additives can include one or more waxes, such as polyethylene wax, polyethylene oxide wax, polypropylene wax and fatty amides, as are generally known in the art. Waxes can improve characteristics of the printed product such as scuff resistance, rub resistance, and abrasion resistance. Silicone can be added to the ink formulation in order to increase slip of the printed materials. Conversely, it may be preferred in some embodiments to include silica in the ink formulation to reduce slip of the printed materials. Other possible additives can include biocides pH control agents, anti-foaming agents, thickeners, anti-coagulation agents, anti-corrosion agents, binders, and so on. When included, additives to the disclosed inks can generally be incorporated in standard amounts for the particular type of ink being formed.

An inkjet electrochromic ink as described herein can be utilized with any inkjet printing system. Ink-jet devices typically include a printer head having one or more nozzles, each of which utilizes a static pressure ink reservoir, a small diameter orifice exiting the ink reservoir, and a voltage-gated orifice exiting the nozzle. The printer head is positioned using a two-dimensional translation mechanism. The volume of liquid dispensed in a drop is generally determined by the characteristics of the voltage-gated nozzle, while the lateral resolution of the device is usually determined by an encoder that senses the relative position of the nozzle and is controlled from a computer by a printer driver.

Generally speaking, any known ink-jet printer and/or ink-jet printing system may be incorporated for use with disclosed inkjet inks. Ink-jet printers are typically either "DOD" (prop-On-Demand) or "continuous" ink-jet printers. In a continuous ink-jet printer, a stream of fluid continuously issues from an orifice. A pressurization actuator (e.g., piezoelectric crystal, acoustic device, thermal device, etc.) induces pressure oscillations in the fluid stream and causes the stream to break into drops. For most DOD ink-jet printers, a pressurization actuator is used at each orifice to produce an ink-jet drop. Some examples of such DOD and continuous ink-jet printers are described in U.S. Pat. Nos. 4,646,106 to Howksins; 5,739,832 to Heinzl, et al.; 6,394,585 to Ross; 6,497,510 to Delametter, et al.; 6,527,378 to Rausch, et al.; 6,536,873 to Lee, et al.; 6,543,872 to Ohtsuka, et al.; 6,561, 642 to Gonzalez; 6,536,895 to Kashiwaqi, et al.; and 6,550, 904 to Koitabashi, et al., which are incorporated herein in their entirety by reference thereto for all purposes. Commercially available examples of some suitable printers that may be utilized with disclosed inks are printers sold by Canon Inc., such as BJC-2100 or BJ-2200, and Hewlett-Packard Co., such as 550C or 660C.

Electrochromic inks as disclosed herein can be printed onto any substrate as is generally known in the art including rigid or flexible substrates, polymer or cellulose substrates, natural or synthetic substrates, laminates, and the like. Substrates that can be printed with the disclosed inks can be translucent, transparent, or opaque, as desired. Examples of substrate materials can include, without limitation, polyester (e.g., polyethylene terephthalate), paper, woven or non-woven fabric, glass, polyolefins (e.g., polypropylene), polycarbonates, polymeric composites (e.g., fiberglass), and so on.

In one embodiment, the disclosed electrochromic inks can be utilized in forming printed circuits. For instance, disclosed inks can be utilized in forming all-polymer transistors (e.g., organic field effect transistors (OFET)). For example, an electrochromic ink can be printed on flexible polymeric substrates with a line width of as little as about 50 micrometers ($\mu$m). The printed pattern is not limited to the formation of such line widths, however, and in other embodiments, much greater or smaller line widths are possible. For instance, the presently disclosed electrochromic inks can be printed with a line width down to about 10 $\mu$m, if desired.

Even at extremely small line widths, the printed inks can exhibit high conductivities. For example, a single-pass print of the disclosed inks can print a conductive line on a PET substrate having a width of as little as about 35 $\mu$m that can exhibit a conductivity greater than about $1\times10^{-3}$ S/cm, for instance between about $1\times10^{-3}$ S/cm and about 100 S/cm. For example, an all-organic printed circuit can exhibit a conductivity of about 25 S/cm.

In one embodiment, an electrochromic ink can be utilized in forming a sensor. For instance, an electrochromic ink can be printed, coated, or otherwise applied to a substrate. Upon alteration in the electrical state of the ink due to, for instance, the presence of an electrical field, an electromagnetic field, or a chemical that can alter the electrical state of the ink, for instance oxidizing agents such as HCl or $H_2SO_4$, reducing agents such as ammonia ($NH_3$) or hydrazine, and the like, the ink can respond to the altered electrical state with a visible color change.

Figure 2:
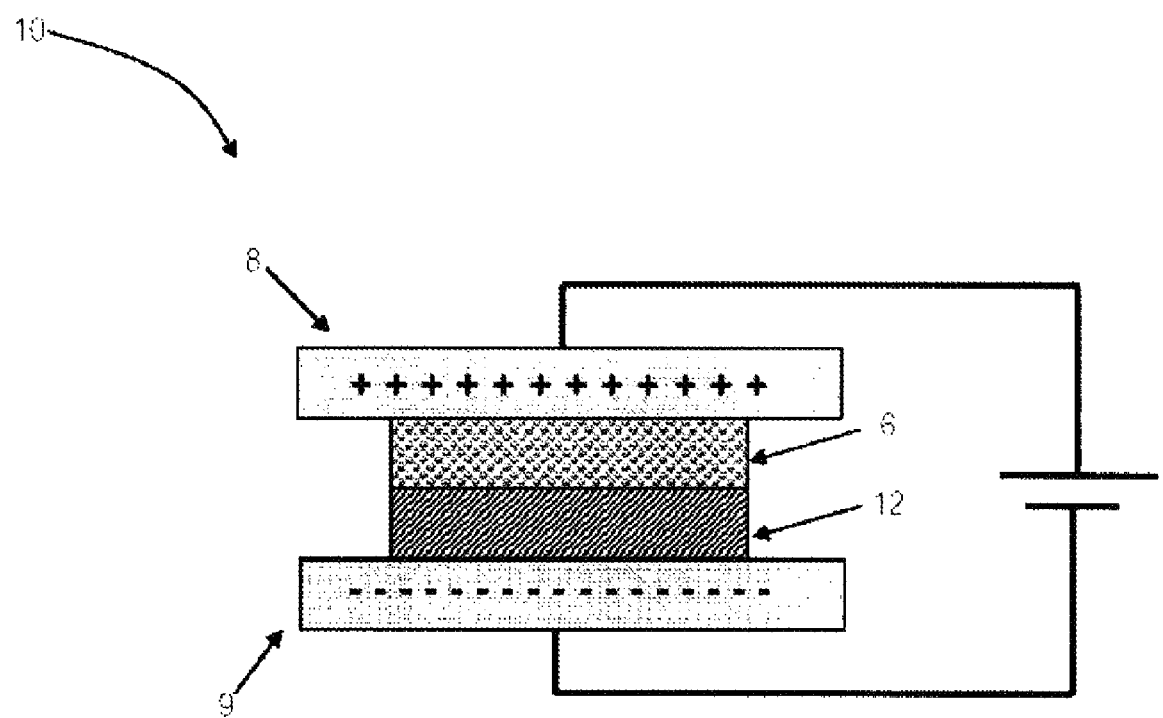
FIG. 2 is a schematic representation of an exemplary electrochromic device (ECD) as disclosed herein.

In another embodiment, disclosed electrochromic inks can be utilized in forming ECDs. FIG. 2 schematically illustrates one embodiment of an ECD 10 incorporating an electrochromic ink. ECD 10 can include a first electrode 8, an electrochromic layer 6 adjacent the first electrode 8, a second electrode 9, and an ion conductor layer 12 between the electrochromic layer 6 and the second electrode 9. In order to be useful as an ECD, the electrochromic layer should be visible from at least one side of the device. Hence, at least one side of the device, i.e., the first electrode 8 on the first side of the electrochromic layer 6 and/or both of the ion conductor layer 12 and the second electrode 9 on the second side of the electrochromic layer 6 can be optically transparent.

Any optically transparent conductive materials as are generally known in the art may be used in forming a transparent electrode. One exemplary transparent conductive material as may be utilized is indium tin oxide (ITO). A transparent electrode can include, for example, an ITO layer coated on a transparent substrate, such as a transparent polyester substrate. Other transparent conductive materials as may be used in forming one or both of the first electrode 8 and the second electrode 9 of an ECD 10 can include, without limitation, F-doped $SnO_2$, delafossite-like materials such as copper delafossites (e.g., $CuAl_{1-x}Ga_xO_2$), zinc oxyfluoride, and cadmium based conducting oxides such as those having the general structure $Cd_{1-x}In_{2-2x}Sn_xO_4$.

The electrochromic layer can be applied directly to an electrically conductive substrate. For example, the electrochromic ink can be printed in a predetermined pattern on the electrically conductive substrate. In one embodiment, an electrochromic pattern can be printed directly onto the desired substrate surface with no alteration necessary from a standard inkjet printing process. For instance, in those embodiments in which the electrically conductive substrate is relatively thin (e.g., less than about 30 mm) and flexible, the substrate can be fed through the inkjet printer and the pattern can be printed according to standard printing methodology. In other embodiments, the printing process may be altered somewhat to fit the particular characteristics of the materials. For instance, the feed mechanism of the printer may be altered to accommodate a thicker substrate. Such alterations are well within the capabilities of one of ordinary skill in the art.

Referring again to FIG. 2, an ECD device can also include an ion conducting layer 12 between the electrochromic layer 6 and the second electrode 9. An ion conducting layer can be any suitable material as is known in the art. For instance, an ion conducting layer can be a transparent ion conducting layer including one or more polyelectrolytes.

In one embodiment, an ECD can be formed including a traditional ion conducting polyelectrolyte layer 12 located between the electrochromic layer 6 and the second electrode 9. Such traditional polyelectrolyte layers generally include a polymeric gel containing a metal salt as the ion carrier and are known in the art. One exemplary such polyelectrolyte material is poly(2-acrylamido-2-methyl-1-propanesulfonic acid) (PAMPS).

In another embodiment, a polyelectrolyte ion conducting network can be crosslinked in situ in the ECD. In accordance with this particular embodiment, a crosslinkable polyelectrolyte composition can be located between an electrochromic layer and an electrically conductive electrode, for instance via injection of the composition between the two layers. Following location of the crosslinkable composition between the two adjacent layers, a monomer or polymer of the composition can be crosslinked in situ to form the crosslinked ion conducting layer. In situ formation of a crosslinked ion conducting layer can beneficially enhance an ECD. For instance, a crosslinked ion conductive layer can be robust and provide excellent ion conduction characteristics. A crosslinked polyelectrolyte layer can be flexible, however, and can encourage the formation of flexible, all polymer ECDs. In addition, the mechanical properties of the crosslinked layer can be controlled through control of the crosslink density of the network. Moreover, crosslinking the layer following assembly of the structure can improve cohesion of the layers.

A crosslinked ion conducting layer may be formed via crosslinking the matrix polymer in the presence of an ion carrier. Any suitable ion carrier can be utilized in the disclosed devices. For instance, a metal salt can be incorporated into the network, generally in an amount of between about 10% and about 20% by weight of the ion conducting layer. Exemplary metal salts as may be utilized in the ion conducting layer can include lithiumperchlorate ($LiClO_4$), lithiumtrifluoromethylsulfonylimide ($Li(CF_3SO_2)_2N$), and the like. Any ion conductor as is generally known in the art can be utilized. For instance, in addition to metal salts, polymeric ion conductors such as poly(ethylene oxide), poly(ethylene glycol), poly(acrylic acid), PAMPS, and so on, can optionally be utilized.

A crosslinkable polymer of the layer can include unsaturated groups or other reactive functional groups on the backbone or side chains of the polymer that can provide crosslink sites. In one preferred embodiment, the crosslinked polyelectrolyte layer can be optically transparent. For instance, the formed polyelectrolyte layer can include an optically transparent cross-linked methacrylate functionalized poly(ethylene glycol) gel that incorporates a metal salt as an ion carrier. Exemplary crosslinkable polymers that can be utilized in forming a crosslinked optically transparent polyelectrolyte layer can include poly(ethylene glycol)methacrylate, poly(ethylene glycol)dimethacrylate, and combinations thereof. Exemplary crosslinkable polymer systems can be utilized such as ethylene glycol methyl ether acrylate (EGMEA) provided as a monomer and ethylene glycol dimethacrylate (EGDMA) provided as a crosslinking agent. Another exemplary system can include ethylene glycol methyl ether methacrylate (EGMEMA) provided as a monomer and EGDMA provided as a crosslinking agent.

Crosslinking may be carried out via self crosslinking of the polymer and/or through the inclusion of a separate crosslinking agent. Suitable crosslinking agents, for instance, may include polyglycidyl ethers, such as ethylene glycol diglycidyl ether and polyethylene glycol diglycidyl ether; acrylamides; compounds containing one or more hydrolyzable groups, such as alkoxy groups (e.g., methoxy, ethoxy and propoxy); alkoxyalkoxy groups (e.g., methoxyethoxy, ethoxyethoxy and methoxypropoxy); acyloxy groups (e.g., acetoxy and octanoyloxy); ketoxime groups (e.g., dimethylketoxime, methylketoxime and methylethylketoxime); alkenyloxy groups (e.g., vinyloxy, isopropenyloxy, and 1-ethyl-2-methylvinyloxy); amino groups (e.g., dimethylamino, diethylamino and butylamino); aminoxy groups (e.g., dimethylaminoxy and diethylaminoxy); and amide groups (e.g., N-methylacetamide and N-ethylacetamide).

Any of a variety of different crosslinking mechanisms may be employed, such as thermal initiation (e.g., condensation reactions, addition reactions, etc.), electromagnetic radiation, and so forth. Some suitable examples of electromagnetic radiation that may be used include, but are not limited to, electron beam radiation, natural and artificial radio isotopes (e.g., $\alpha$, $\beta$, and $\gamma$ rays), x-rays, neutron beams, positively-charged beams, laser beams, ultraviolet, etc. Electron beam radiation, for instance, involves the production of accelerated electrons by an electron beam device. Electron beam devices are generally well known in the art. For instance, in one embodiment, an electron beam device may be used that is available from Energy Sciences, Inc., of Woburn, Mass. under the name "Microbeam LV." Other examples of suitable electron beam devices are described in U.S. Pat. Nos. 5,003,178 to Livesay; 5,962,995 to Avnery; 6,407,492 to Avnery, et al., which are incorporated herein in their entirety by reference thereto for all purposes. The wavelength $\lambda$ of the radiation may vary for different types of radiation of the electromagnetic radiation spectrum, such as from about $10^{-14}$ meters to about $10^{-5}$ meters. Electron beam radiation, for instance, has a wavelength $\lambda$ of from about $10^{-13}$ meters to about $10^{-9}$ meters. Besides selecting the particular wavelength $\lambda$ of the electromagnetic radiation, other parameters may also be selected to control the degree of crosslinking. For example, the dosage may range from about 0.1 megarads (Mrads) to about 10 Mrads, and in some embodiments, from about 1 Mrads to about 5 Mrads.

The source of electromagnetic radiation may be any radiation source known to those of ordinary skill in the art. For example, an excimer lamp or a mercury lamp with a D-bulb may be used. Other specialty-doped lamps that emit radiation at a fairly narrow emission peak may be used with photoinitiators which have an equivalent absorption maximum. For example, the V-bulb, available from Fusion Systems, is another suitable lamp for use. In addition, specialty lamps having a specific emission band may be manufactured for use with one or more specific photoinitiators.

Initiators may be employed in some embodiments that enhance the functionality of the selected crosslinking technique. Thermal initiators, for instance, may be employed in certain embodiments, such as azo, peroxide, persulfate, and redox initiators. Representative examples of suitable thermal initiators include azo initiators such as 2,2'-azobis(2,4-dimethylvaleronitrile), 2,2'-azobis(isobutyronitrile), 2,2'-azobis-2-methylbutyronitrile, 1,1'-azobis(1-cyclohexanecarbonitrile), 2,2'-azobis(methyl isobutyrate), 2,2'-azobis(2-amidinopropane) dihydrochloride, and 2,2'-azobis(4-methoxy-2,4-dimethylvaleronitrile); peroxide initiators such as benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butylperoxy-2-ethylhexanoate, and dicumyl peroxide; persulfate initiators such as potassium persulfate, sodium persulfate, and ammonium persulfate; redox (oxidation-reduction) initiators such as combinations of the above persulfate initiators with reducing agents such as sodium metabisulfite and sodium bisulfite, systems based on organic peroxides and tertiary amines, and systems based on organic hydroperoxides and transition metals; other initiators such as pinacols; and the like (and mixtures thereof). Azo compounds and peroxides are generally preferred. Photoinitiators may likewise be employed, such as substituted acetophenones, such as benzyl dimethyl ketal and 1-hydroxycyclohexyl phenyl ketone; substituted alpha-ketols, such as 2-methyl-2-hydroxypropiophenone; benzoin ethers, such as benzoin methyl ether and benzoin isopropyl ether; substituted benzoin ethers, such as anisoin methyl ether; aromatic sulfonyl chlorides; photoactive oximes; and so forth (and mixtures thereof). Other suitable photoinitiators may be described in U.S. Pat. No. 6,486,227 to Nohr, et al. and U.S. Pat. No. 6,780,896 to MacDonald, et al., both of which are incorporated herein by reference.

The disclosed subject matter may be more clearly understood with reference to the Examples set forth below.

Example 1

PANI-Silica Synthesis 1.5 g of a 40% (w/w) aqueous solution of 20-30 nm sized silica sol particles (available from Nyacol Nano Technologies, Inc. of Ashland, Mass.) was added to 100 ml of 0.5M paratoluene sulfonic acid (p-TSA) solution containing 1.57 g of ammonium peroxidisulfate at room temperature with constant stirring. Aniline (0.5 mL) was then injected and the reaction mixture was reacted for 16 hours. FIGS. 3A and 3B TEM images of a plurality of PANI-silica nanocomposite particles formed according to the process.

PEDOT-Silica Synthesis 3.3 g of a 30% (w/w) aqueous solution of methanolic 20-30 nm sized silica sol particles dispersion (MA-ST-M, available from Nissan Chemical America Corporation of Houston, Tex.) was added to 90 ml of 0.5M paratoluene sulfonic acid (p-TSA) solution containing 1.57 g of ammonium peroxidisulfate at room temperature with constant stirring. EDOT dissolved in 10 ml of methanol (1g) was then injected and the reaction mixture was reacted for 16 hours. FIGS. 4A and 4B are TEM images of PEDOT-silica nanocomposite particles formed as described.

Following initial formation, the resulting reaction mixtures were centrifuged at 6000 rpm for 30 minutes and the dark green (PANI) and blue (PEDOT) sediment, respectively, was re-dispersed in water using ultrasonic bath for 1 hour and this centrifugation re-dispersion procedure was repeated three times. 4-probe conductivity measurements on the pressed pellets formed following the final centrifugation indicated the conductivity to be 1 S/cm for the PANI-silica nanocomposites and $1.5 \times 10^{-1}$ S/cm for the PEDOT-silica nanocomposites. The conductivity was measured by the conventional 4-probe method using the ALESSI CP-05 contact probe station connected to a Keithley 220 Programmable Current Source and a Keithley 2000 Multimeter.

Example 2

To form an inkjet printer ink, a 40 ml aqueous dispersion of the formed nanocomposite (either PANI-silica nanocomposite or PEDOT-silica nanocomposite) was centrifuged for 30 minutes at 6000 rpm and supernatant was removed. Subsequently, the resulting sediment was re-dispersed in 15 ml of propylene carbonate solvent using ultrasonic bath for 1 hour. Additives included in the ink formulation included 150 µl glycerol added as a humectant, 120 µl triethyleneglycol monobuytl ether added as a penetrating agent, and 150 µl diethyl ether added as a drying agent.

The surface coating characterizations of the formed inks were compared to those of the aqueous dispersions of the nanoparticles.

Initially, droplet formation on a film was compared. Films used throughout these examples were polyethylene terephthalate (PET) substrates coated with indium tin oxide (ITO) (OC™50 purchased from CPFilms of Martinsville, Va.). Static contact angle measurements of droplets of PANI-silica composite particles dispersed in water and formulated PANI-silica inks on ITO-PET film were made using a contact angle goniometer (Kruss, model DSA 10) with a static time of 60 seconds prior to the angle measurement. Calculation of the contact angle was made using the tangent method.

FIG. 5A illustrates a droplet of PANI-silica particles dispersed in water on an ITO-PET film surface. As can be seen, the droplet of PANI-silica particles dispersed in water beads up on the ITO-PET film surface. Contact angle was determined to be 79.58°. The high contact angle is believed to be due to the high surface tension of the droplet on the high energy surface of ITO.

FIG. 6A, in comparison, illustrates a droplet of the PANI-silica nanocomposite ink. As can be seen, the ink formulation spreads more efficiently on an ITO-PET film surface, exhibiting a contact angle of 31.42°. Replacing the protic polar dispersion medium with the aprotic polar organic solvent reduced the surface tension of a droplet on the ITO surface, facilitating the effective spreading of a droplet of composite particles on the surface of ITO-PET film. (Note that the surface tension values of water and propylene carbonate at 20° C. are 72.8 and 41.4 mN/m, respectively.)

Following droplet comparison, the formulated inks and aqueous dispersions of the nanocomposites were compared with regard to inkjet printing capability. A commercially available HP DeskJet 5550™ ink jet printer was used. Printing patterns were designed and printed using MSWord™. 500 µl of either the formulated ink or an aqueous dispersion of the nanocomposite particles was injected into empty inkjet cartridge and the cartridge was loaded onto the printer according to standard methodology. An ITO-PET film was fed in to the printer and patterns were deposited on the ITO-PET film. Surface appearance the inkjet printed materials was observed with a Ziess microscope, coupled with an Axio plan CCD camera at the magnification of ×5 and ×50.

FIGS. 5B and 6B present optical microscopic images exhibiting the surface morphology of the printed layers of the PANI-silica nanocomposite particles in water (FIG. 5B) and the PANI-silica ink formulation (FIG. 6B). As can be seen, the aqueous dispersion print shows an island-type morphology formed by unconnected individual droplets. In comparison, the PANI-silica ink leaves a uniform coating on the ITO-PET surface.

Figure 7:
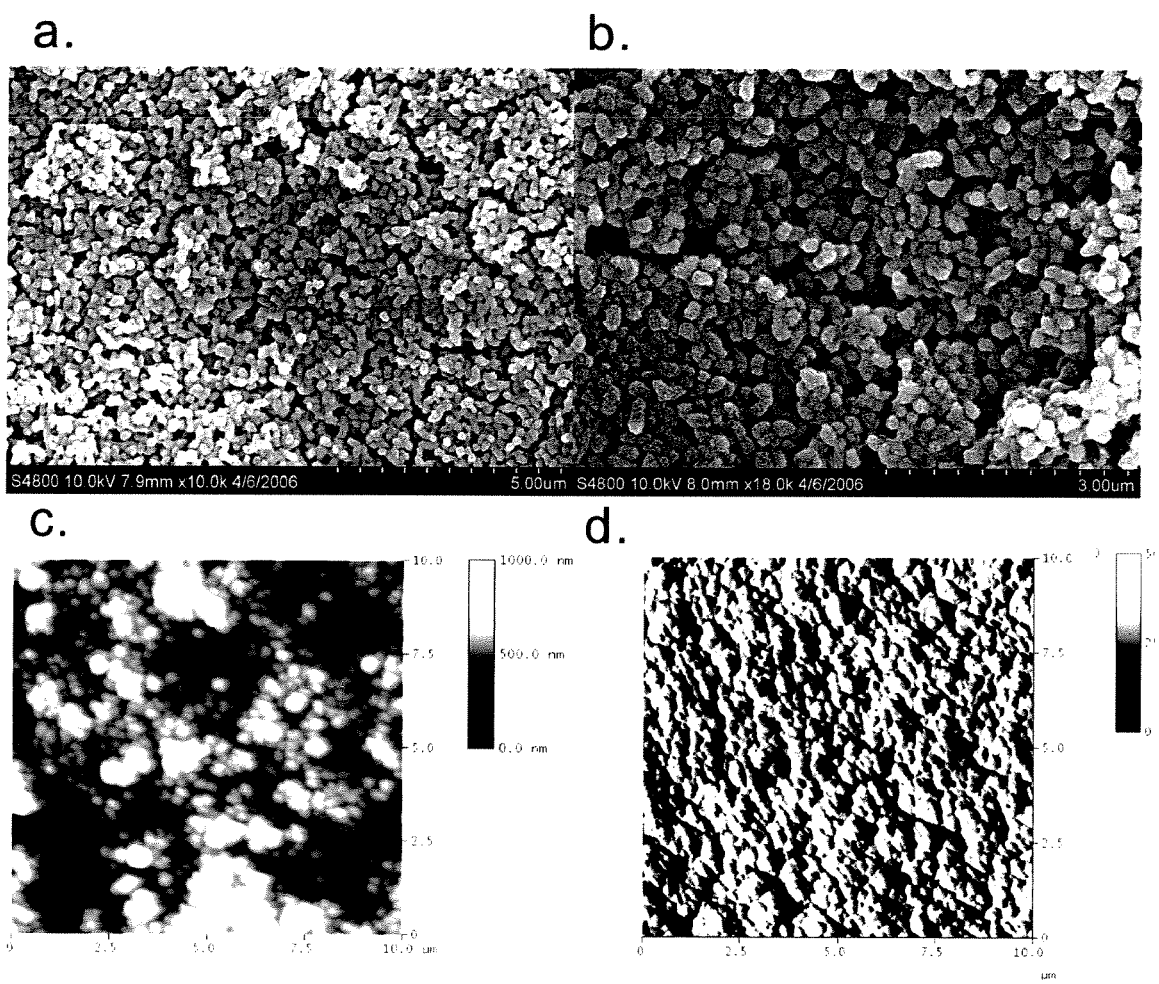
FIG. 7A is a scanning electron micrograph (SEM) image of an inkjet printed pattern of a PEDOT-silica nanocomposite-containing ink as herein described at 10000× magnification.
FIG. 7B is an SEM image of an inkjet-printed pattern of a PANI-based ink at 18000× magnification.
FIG. 7C is an AFM contact mode image of an inkjet printed pattern of a PANI-based ink.
FIG. 7D is an AFM image of an inkjet-printed pattern of a PANI-based ink in the phase mode.

In addition, further surface morphology of inkjet printed PANI-silica ink was observed by means of Scanning Electron Microscopy (SEM) and Atomic Force Microscopy (AFM). SEM images were obtained using HITACHI FESEM 4800. FIG. 7a is an SEM micrograph of the surface of an inkjet-printed PEDOT layer at 10K× and FIG. 7b present an SEM image of the surface of an inkjet-printed PANI layer at 18K×. AFM images in contact and phase modes are presented in FIG. 7c & d. In the SEM images of the surface of the inkjet-printed PEDOT particles and the PANI particles (FIGS. 7A and 7B, respectively), several layers of PEDOT-silica and PANI-silica particles can be seen, deposited on the ITO-PET film through the printing process. The thickness of the inkjet printed layer was found to be about 800 nm (thickness of the inkjet printed electrochromic layer was measured by Alpha step 200 profilometer available from Tencor Instrument) and sizes of the PANI-silica particles were found to be between about 300-400 nm by Transmission Electron Microsopy (TEM; Hitachi H-7600). Thus, it was estimated that 2-3 layers of PANI-silica particles were deposited on the ITO-PET during the inkjet printing. In the AFM contact mode image (FIG. 7C), the root mean square (rms) value was estimated to be 154 nm, indicating a rough surface formed by the PANI-siclica particles on an ITO-PET film having roughness (rms) value of 3.2 nm. In the phase mode image (FIG. 7D), the formation of a rough surface having the shape of these particles is clearly observed. Phase and contact images were obtained using a BioScope AFM (Veeco) with Nanoscope 111a controller. The Contact and the Phase-imaging mode are used to characterize the surface of the printed layer in the ambient condition. The dimension of the scanned area on the inkjet-printed PANI-silica layer was 10 µm×10 µm.

Example 3

Electrochromic devices were formed using electrochromic inks prepared according to the processes described in Example 1.

To form a cross-linkable polyelectrolyte composition, 1.5 g of lithium perchlorate was added to 20 ml of propylene carbonate and dissolved for 12 hrs.

500 µl of polyethylene glycol methacrylate (PEGMA), 50 µl of polyethylene glycol dimethacrylate (PEGDMA), and 5 µl α,α-diethoxyacetophenone were added to a 5 ml solution of the lithium perchlorate/propylene carbonate solution. This solution was mixed using a vortex mixer. (All chemicals were purchased from either Aldrich or Acros Organics.)

Electroactive inks were printed on ITO-PET films as described above in Example 2. Three different inks were examined, the first included a dispersion of PANI-silica nanocomposite particles, the second included PEDOT-silica nanocomposite particles, and the third included a blended particles in the ratio of 80:20 PEDOT:PANI (% VN). Specifically, 2 ml of the PANI-silica dispersion in propylene carbonate was added to 8 ml of the PEDOT-silica dispersion in propylene carbonate and the combination was agitated for 1 hour on a wrist action shaker to form the blended ink.

An ITO-PET film patterned with one of the three electrochromic inks and another piece of ITO-PET film were layered together with a 125 µm thick Para film spacer located between two films. The polymeric electrolyte composition formed as described above was injected in to the space between the two films. The layered device was then held under UV-light for 4 minutes, turned over, and again held under UV light for an additional 4 minutes to initiate crosslinking of the polymeric electrolyte layer. The ECDs thus formed varied according to the ink used in the electrochromic layer and are referred to herein as a PANI ECD, which includes the PAM-silica ink, a PEDOT ECD, which included the PEDOT-silica ink, and a PANI/PEDOT ECD, which included the blended nanocomposite particles.

In situ optical characterizations for various applied potentials were performed with the assembled cells with Perkin Elmer Lambda 900 U.V.-Visible spectrophotometer in combination with CH Instrument Model 660B Electrochemical Workstation.

The assembled ECDs, each composed of an inkjet printed electrochromic layer and an ion conducting layer on each electrode, exhibited color changes corresponding to their redox states upon applied electric potential to the cell. FIG. 8A presents the UV-Visible absorption spectra of a PANI ECD obtained at every 100 mV between −0.3V and +0.6V versus Ag. Insets are images of the PANI ECD at bleached (left) and colored (right) state. The resulting spectra clearly show the changes in the major absorption bands as a consequence of the reduction and oxidation of the PANI. The absorption band at 330 nm is characteristic of the leucoemeraldine form of PANI, corresponding to the π–π* transition of the benzenoid ring, and the absorption band at approximately 780 nm represents the emeraldine states of PANI resulting from polaronic absorption. As the electrode potential shifted from −0.3V to +0.6V, the absorption band at 780 nm increased with a simultaneous decrease in the band intensity at 330 nm resulting from the progressive oxidation of PANI from its leucoemeraldine state to its conducting emeraldine state. These spectral responses are evidenced by the images of the device in the insets. In addition, the absorption band at 435 nm, appearing from 0.1V, corresponds to an intermediate state formed during the electro-oxidation of the leucoemeraldine form of PANI.

FIG. 8B presents the spectroelectrochemical results of a PEDOT ECD and inset images of device at reduced (lower left) and oxidized (upper right) state. UV absorption spectra of a PEDOT ECD were obtained at every 100 mV between −0.7V and +0.5V versus Ag. The absorption spectral responses clearly reflected the changes in the major absorption bands as a consequence of redox reaction of PEDOT. The absorption band at 560 nm is characteristic of the reduced form of PEDOT, corresponding to the π–π* transition, and the absorption band at approximately 800 nm representing the oxidized states of PEDOT, stems from polaronic absorption. As the electrode potential was raised from −0.7V to +0.5V, the absorption band at 800 nm increased, with the simultaneous decrease in the absorption band intensity at 560 nm resulting from the progressive oxidation of PEDOT from its reduced state to its oxidized state. Resulting color changes of PEDOT ECD from dark blue at reduced state (−2V) to light blue at oxidized state(+2V) are apparent in the inset images.

Figure 9:
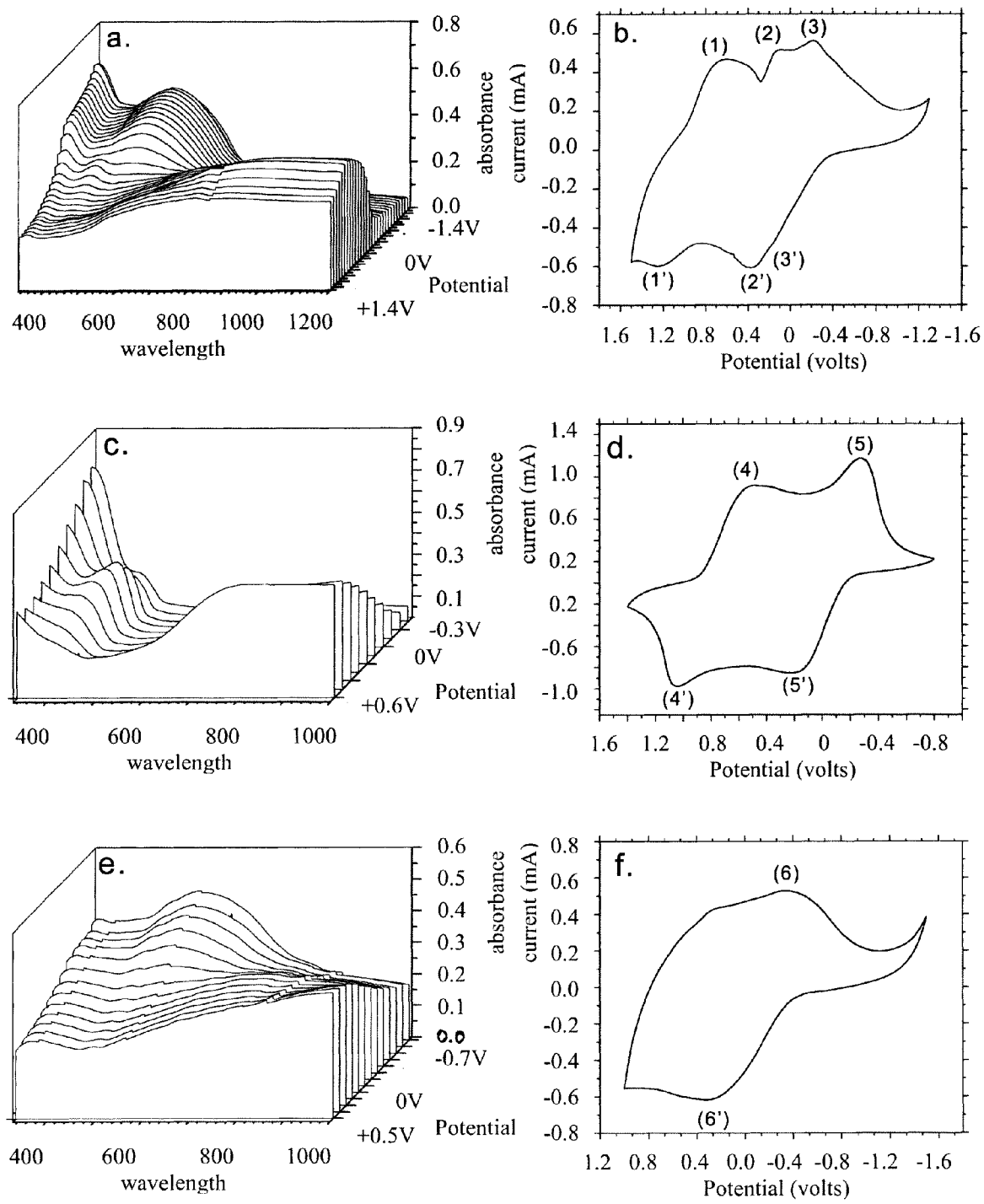
FIG. 9A is a three dimensional plot of the spectroelectrochemical response of an ECD formed with an ink including a blend of PANI-silica and PEDOT-silica nanocomposite particles.
FIG. 9B is the cyclic voltamogram of the ECD of FIG. 9A.
FIG. 9C is a three dimensional plot of the spectroelectrochemical response of an ECD formed with a PANI-based ink as described herein.
FIG. 9D is the cyclic voltamogram of the ECD of FIG. 9C.
FIG. 9E is a three dimensional plot of the spectroelectrochemical response of an ECD formed with a PEDOT-based ink as described herein.
FIG. 9F is the cyclic voltamogram of the ECD of FIG. 9E.

Optical and electrochemical properties of the combined PANI/PEDOT ECD as well as the PANI ECD and the PEDOT ECD were characterized by means of spectroelectrochemical analysis and cyclic voltametry. FIGS. 9A, 9C, and 9E are three dimensional plots of a spectroelectrochemical response of a PANI/PEDOT ECD, PANI ECD, and PEDOT ECD, respectively.

The absorption spectra of the PANI/PEDOT ECD were taken from −1.4V to +1.4V versus Ag at every 100 mV. At 1.4V, both of the absorption bands from reduced forms of PANI and PEDOT are clearly observed at 340 nm and 560 nm respectively (FIG. 9A) as is evidenced by spectroelectrochemical response of each of the PANI ECD (FIG. 9C) and PEDOT ECD (FIG. 9E). As the potential was raised from −1.4V to +1.4V, both of PANI and PEDOT are gradually oxidized. Consequently, absorption bands at 780 nm from PANI (FIG. 9C) and 800 nm from PEDOT (FIG. 9E) are increased and form broad absorption bands from 700 nm (FIG. 9A) with the simultaneous decrease of absorption bands at 340 nm and 560 nm.

The cyclic voltamogram of the PANI/PEDOT ECD reflects the reversible redox reaction of both PANI-silica and PEDOT-silica colloidal particles. FIG. 9B shows the cyclic voltamogram the PANI/PEDOT ECD in the potential range −1.4 to +1.5V versus Ag at the scan rate of 50 mV/sec. FIG. 9D shows the cyclic voltamogram of PANI ECD in the potential range −0.8 to +1.4V versus Ag at the scan rate of 50 mV/sec. FIG. 9F shows the cyclic voltamogram of PEDOT ECD in the potential range −1.5 to +1.0V versus Ag at the scan rate of 50 mV/sec.

In the cyclic voltamogram of the PANI/PEDOT ECD, three cathodic peaks marked (1), (2), (3), and three corresponding anodic peaks marked (1'), (2'), (3'), can be observed, reflecting all reversible redox transition of PANI (FIG. 9D) and PEDOT (FIG. 9F) in the given potential range. The cyclic voltamogram of the PANI ECD in FIG. 9D shows two reduction peaks marked (4) and (5) and the corresponding two oxidation peaks marked (4'), (5') that respond to the reversible transition of PANI from emeraldine to leucoemeraldine, leucoemeraldine to emeraldine, and emeraldine to nigraniline. In addition, the cyclic voltamogram of PEDOT ECD in FIG. 9F shows an cathodic peak, marked (6), and a corresponding anodic peak, marked (6'), representing reversible transition of PEDOT from reduced state to oxidized state.

Figure 10:
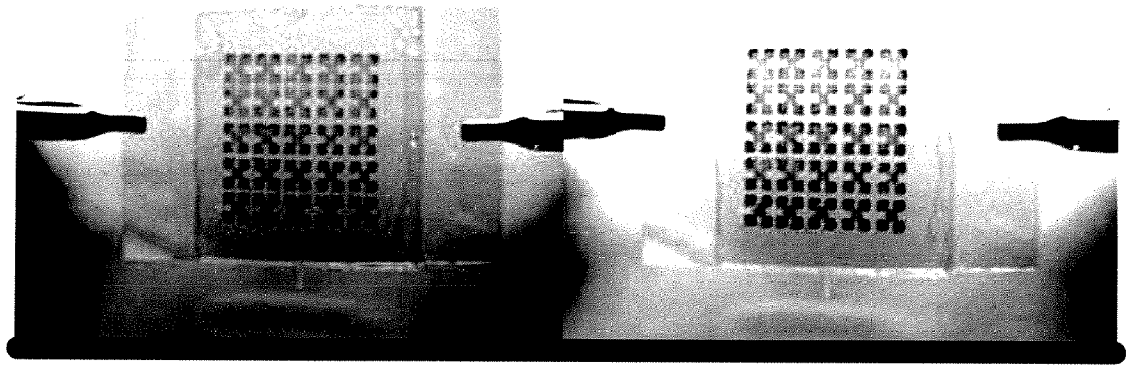
FIGS. 10A-10C illustrate examples of ECDs as described herein at reduced and oxidized states.
Figure 10:
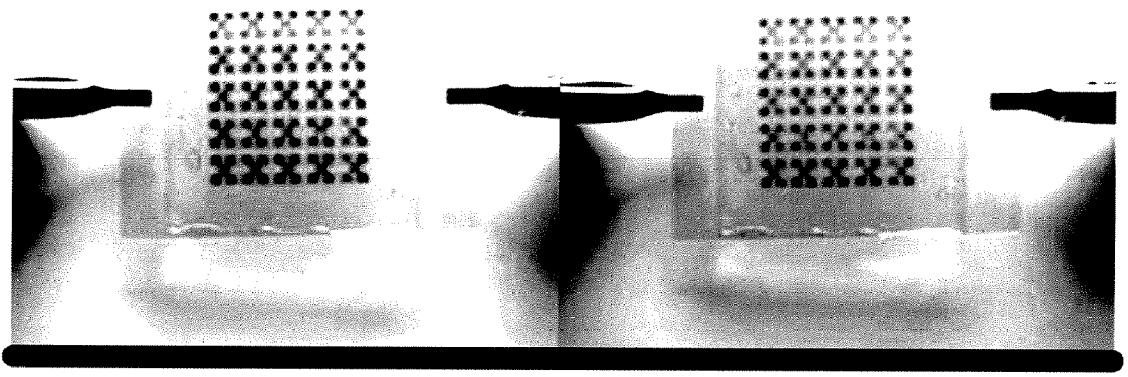
Figure 10:
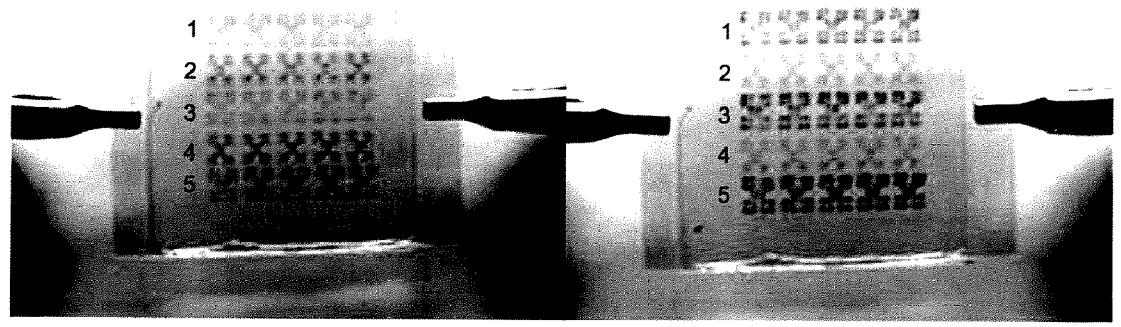

FIG. 10 illustrates a PANI ECD (FIG. 10A), a PEDOT ECD (FIG. 10B), and an ECD including alternate rows of PANI ink and PEDOT ink in the printed pattern (FIG. 10C). FIG. 10A presents a patterned PANI ECD with 5×5 array of cross-shaped patterns, consisting of 5 square pixels (500 μm×500 μm) and FIG. 10B is a PEDOT ECD with the same 5×5 array of cross patterns. Upon applying a voltage, the PANI ECD presented in FIG. 10A shows a color change, from light yellow at −2V (right) to blue at +2V (left). The PEDOT ECD presented in FIG. 10B also showed a clear color change from dark blue (right) to light blue (left) at −2V and +2V respectively.

FIG. 10C shows an ECD including a similar 5×5 array of cross patterns consisted of 5 square pixels (500 μm×500 μm). However, in this ECD the first, third, and fifth rows have been printed with a PANI ink and the second and fourth rows have been printed with a PEDOT ink. Consequently, two different electroactive materials on the same electrode show their own electrochromic response on applied potentials. At −2V (left), both of the PANI and PEDOT patterns are reduced and three rows of PANI patterns show light yellow and the other two PEDOT rows turn to dark blue. At +2V (right), 3 columns of PANI patterns turn to blue and the rest PEDOT columns turn to light blue by oxidation. Thus, dual image display is realized using this unique type of device without necessity of individual electrodes.

Example 4

For other applications, ICP inks were printed on various substrates such as commercial transparency films and fabrics using electrochromic inks prepared according to the processes described in Example 1.

Figure 11:
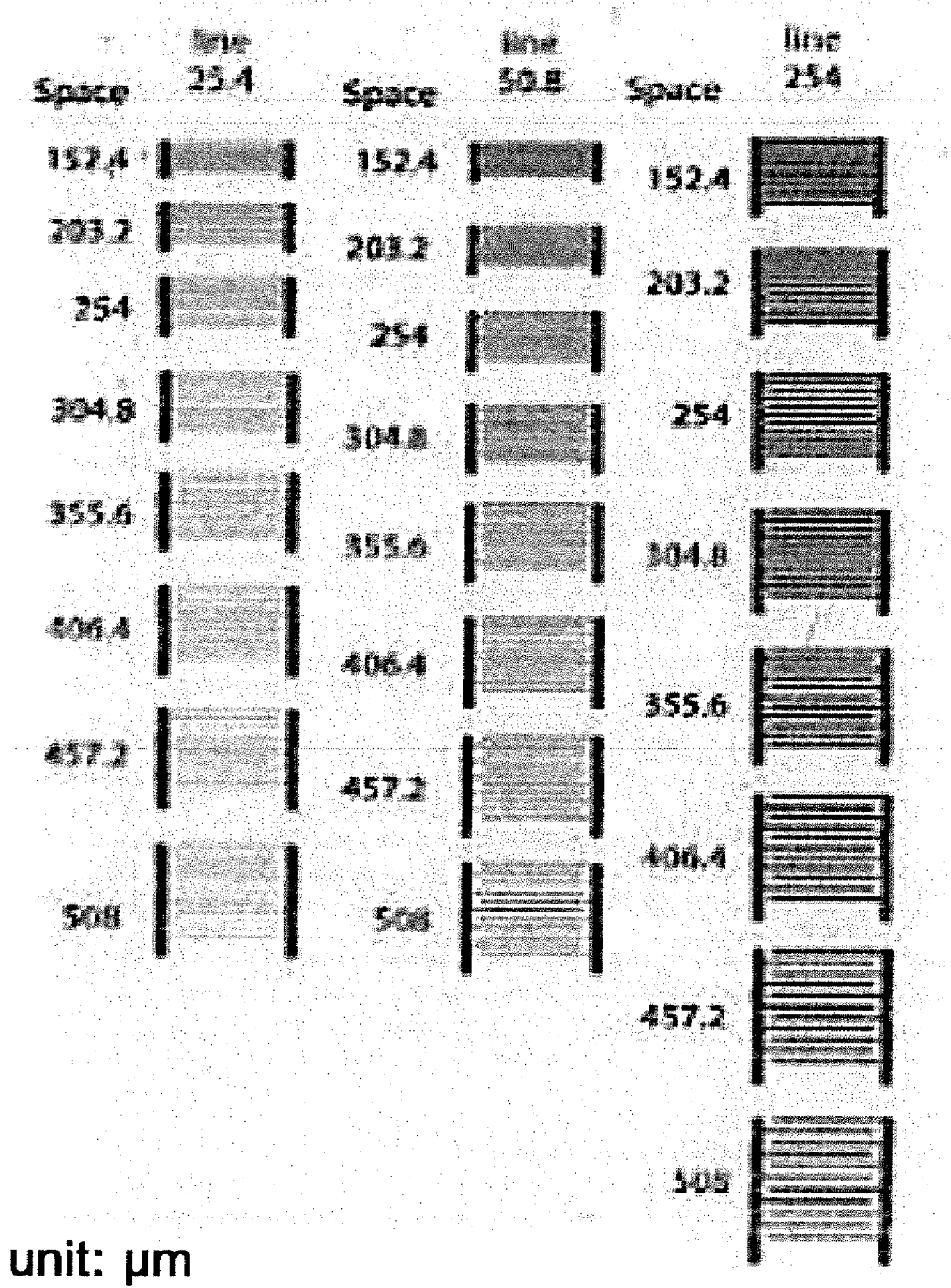
FIG. 11 is an optical image of inkjet printed interdigitated patterns printed on a commercial PET transparency film with inks including PANI-silica nanocomposite particles.

FIG. 11 presents inkjet printed PANI interdigitated design on a commercial transparency film (purchased from 3M Corporation). The thickness of lines in each interdigitated patterns range from 25 μm to 250 μm and the spaces among those lines range from 152 μm to 510 μm. Such interdigitated patterns can be utilized as the electrode of a polymer thin film transistor (TFT).

Figure 12:
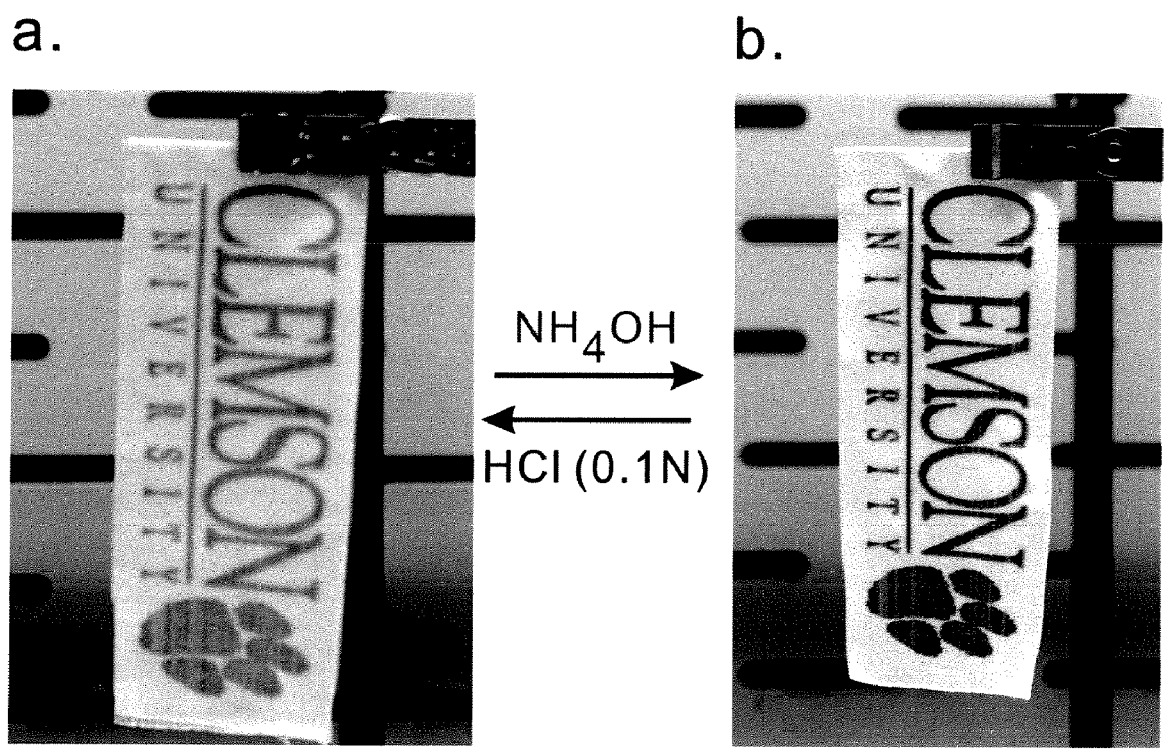
FIGS. 12A and 12B illustrate color changes of inkjet printed PANI patterns on a cotton fabric up on the spraying of hydrochloric acid (0.1 N, blue to green), and on the spraying of ammonium hydroxide (green to blue).

PANI-silica ink was also printed on a plain weave cotton fabric. FIG. 12 illustrates an inkjet printed CLEMSON logo with PANI-silica ink on a cotton fabric. Such an inkjet printed PANI-silica on fabric can be utilized as a chemical sensor. Specifically, the ink can be chemically oxidized and reduced in the presence of analytes with corresponding color changes in a reversible manner. FIG. 12 exhibits the color change of the illustrated PANI-based ink due to the de-doping and re-doping process obtained upon spraying ammonium hydroxide solution and hydrochloric acid aqueous solution (0.1 N). On exposure to ammonium hydroxide solution, this pattern changes its color from green (FIG. 12A) to light blue (FIG. 12B) through the reduction of PANI. Following, 0.1 N hydrochloric acid solution was sprayed again on the wet pattern and this pattern shows the color change from light blue (FIG. 12B) back to green (FIG. 12A), representing the oxidation of the PANI by hydrochloric acid.

It will be appreciated that the foregoing examples, given for purposes of illustration, are not to be construed as limiting the scope of this disclosure. Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A printable ink comprising
a carrier liquid;
a plurality of a first composite particle dispersed within the carrier liquid, the first composite particle having a maximum cross sectional diameter of less than about 500 nanometers, the first composite particle including a plurality of nanoparticles and an intrinsically conductive polymer, the first composite particle having a conductivity between about $1 \times 10^{-4}$ S/cm and about 10 S/cm; and
a monomeric dopant in the intrinsically conductive polymer; wherein
the printable ink is an electrochromic ink, the first composite particles exhibiting a color change upon a change in the electrical state of the ink.

2. The printable ink of claim 1, wherein the ink changes electric state upon alteration of the redox state of the intrinsically conductive polymer.

3. The printable ink of claim 1, wherein the nanoparticles include silica nanoparticles.

4. The printable ink of claim 1, wherein the first composite particle is colloidal.

5. The printable ink of claim 1, wherein the carrier liquid is organic.

6. The printable ink of claim 5, wherein the carrier liquid is an aprotic polar organic liquid.

7. The printable ink of claim 1, further comprising second composite particles dispersed within the carrier liquid, the second composite particles having a maximum cross sectional diameter of less than about 500 nanometers, the second composite particles including a nanoparticle and an intrinsically conductive polymer, wherein the second composite particles exhibit a color change upon a change in the electrical state of the ink that is different from the color change of the first composite particles upon the change in the electrical state of the ink.

8. The printable ink of claim 1, wherein the ink is an inkjet ink.

9. A method for forming a printed device comprising printing a pattern on a substrate with the printable ink of claim 1.

10. The method according to claim 9, wherein the pattern is printed according to a non-contact printing process.

11. The method according to claim 10, wherein the pattern is printed according to an inkjet printing process.

12. The method according to claim 9, wherein the substrate is conductive.

13. The method according to claim 12, further comprising forming an ion conductive layer on the printed pattern.

14. A printable ink comprising
a carrier liquid; and
a plurality of a first composite particle dispersed within the carrier liquid, the first composite particle having a maximum cross sectional diameter of less than about 500 nanometers, the first composite particle including a plurality of nanoparticles and an intrinsically conductive polymer, the first composite particle having a conductivity between about $1\times10^{-4}$ S/cm and about 10 S/cm, the first composite particles exhibiting a color change upon a change in the electrical state of the ink; and
second composite particles dispersed within the carrier liquid, the second composite particles having a maximum cross sectional diameter of less than about 500 nanometers, the second composite particles including a nanoparticle and an intrinsically conductive polymer, wherein the second composite particles exhibit a color change upon a change in the electrical state of the ink that is different from the color change of the first composite particles upon the change in the electrical state of the ink; wherein
the printable ink is an electrochromic ink.

15. The printable ink of claim 14, wherein the nanoparticles include silica nanoparticles.

16. The printable ink of claim 14, wherein the carrier liquid is organic.

17. A method for forming a printed device comprising printing a pattern on a substrate with the printable ink of claim 14.

18. The method according to claim 17, wherein the substrate is conductive.

19. The method according to claim 18, further comprising forming an ion conductive layer on the printed pattern.

20. A printable ink comprising
a carrier liquid; and
a plurality of a first composite particle dispersed within the carrier liquid, the first composite particle having a maximum cross sectional diameter of less than about 500 nanometers, the first composite particle including a plurality of nanoparticles and an intrinsically conductive polymer, the first composite particle having a conductivity between about $1\times10^{-4}$ S/cm and about 10 S/cm, the first composite particles exhibiting a color change upon a change in the electrical state of the ink; wherein
the printable ink is an electrochromic ink with a solids content of less than about 15% by weight of the ink and a viscosity of between about 8 mPaS and about 20 mPaS.

21. The printable ink of claim 20, wherein the nanoparticles include silica nanoparticles.

22. The printable ink of claim 20, the first composite particle further comprising a monomeric dopant.

23. The printable ink of claim 20, wherein the first composite particle is colloidal.

24. The printable ink of claim 20, wherein the carrier liquid is organic.

25. The printable ink of claim 20, further comprising second composite particles dispersed within the carrier liquid, the second composite particles having a maximum cross sectional diameter of less than about 500 nanometers, the second composite particles including a nanoparticle and an intrinsically conductive polymer, wherein the second composite particles exhibit a color change upon a change in the electrical state of the ink that is different from the color change of the first composite particles upon the change in the electrical state of the ink.

26. A method for forming a printed device comprising printing a pattern on a substrate with the printable ink of claim 20.

27. The method according to claim 26, wherein the pattern is printed according to an inkjet printing process.

28. The method according to claim 26, wherein the substrate is conductive.

* * * * *